United States Patent [19]

Chapman, Jr. et al.

[11] Patent Number: 5,132,368

[45] Date of Patent: Jul. 21, 1992

[54] FLUOROPOLYMER PROCESS AIDS CONTAINING FUNCTIONAL GROUPS

[75] Inventors: George R. Chapman, Jr., Media, Pa.; Donnan E. Priester, Wilmington, Del.; Charles W. Stewart, Newark, Del.; Robert E. Tarney, Hockessin, Del.

[73] Assignee: E. I. Du Pont de Nemours and Company, Wilmington, Del.

[21] Appl. No.: 758,425

[22] Filed: Sep. 3, 1991

Related U.S. Application Data

[63] Continuation of Ser. No. 572,922, Aug. 29, 1990, abandoned, which is a continuation-in-part of Ser. No. 418,376, Oct. 6, 1989, abandoned, and a continuation-in-part of Ser. No. 461,093, Jan. 4, 1990, abandoned, which is a continuation-in-part of Ser. No. 216,421, Jul. 8, 1988, Pat. No. 4,904,735.

[51] Int. Cl.$^5$ .................... C08L 27/12; C08L 23/02; C08L 77/00; C08L 67/00
[52] U.S. Cl. .................... 525/165; 525/166; 525/175; 525/176; 525/178; 525/179; 525/182; 525/183; 525/200; 525/199; 525/72
[58] Field of Search ........... 525/165, 175, 176, 178, 525/183, 199, 200

[56] References Cited

U.S. PATENT DOCUMENTS

| 3,005,795 | 10/1961 | Busse | 525/175 |
| 3,125,547 | 3/1964 | Blatz | 525/199 |
| 3,294,871 | 12/1966 | Schmitt et al. | 525/175 |
| 3,334,157 | 8/1967 | Larsen | 525/199 |
| 4,753,995 | 3/1988 | Chu et al. | 525/199 |
| 4,855,360 | 8/1989 | Duchesne et al. | 525/187 |
| 4,904,735 | 2/1990 | Chapman et al. | 525/199 |

FOREIGN PATENT DOCUMENTS 59-113059 6/1984 Japan.
63-55543 11/1988 Japan.

Primary Examiner—Carman J. Seccuro

[57] ABSTRACT

The subject invention provides a composition having excellent extrusion characteristics comprising a difficulty-melt-processible polymer and 0.002–0.5 wt. % of one or more fluoropolymer process aids wherein the fluoropolymer has a fluorine to carbon ratio of at least 1:2, is capable of forming a die-coating film under the prevailing conditions of extrusion temperature and pressure, and contains an effective amount of polar functional polymer chain end groups, —W, wherein —W is selected from —COF, —SO$_2$F, —SO$_3$M, —OSO$_3$M, —COOR, and —COOM, wherein R is C$_{1-3}$ alkyl and M is hydrogen, a metal cation, preferably an alkali or alkaline earth metal cation, or a quaternary ammonium cation.

70 Claims, 7 Drawing Sheets

FLUOROPOLYMER PROCESS AIDS CONTAINING FUNCTIONAL GROUPS

CROSS-REFERENCE TO RELATED APPLICATIONS

This application is a continuation of application Ser. No. 07/572,922 filed Aug. 29, 1990, now abandoned, which is a continuation-in-part of application Serial No. 07/418,376 filed Oct. 6, 1989 and of application Ser. No. 07/461,093 filed Jan. 4, 1990 as a continuation-in-part of application Ser. No. 07/216,421 filed Jul. 8, 1988 and issued Feb. 27, 1990 as U.S. Pat. No. 4,904,735. Application Ser. No. 07/461,093 was allowed Jun. 1, 1990. Application Ser. No. 07/418,376 was abandoned after the filing of application Ser. No. 572,922 and application Ser. No. 07/461,093 was abandoned after the filing of continuation-in-part application Ser. No. 07/572,921 which was allowed and issued May 7, 1991 as U.S. Pat. No. 5,013,792.

BACKGROUND OF THE INVENTION

1. Field of the Invention

This invention relates to improved process aid compositions for the melt extrusion of difficultly-melt-processible polymers.

2. Background

In the melt extrusion of polymer resins there are often flow regimes, determined by the rheological properties of the particular resin, where anomalous flow behavior occurs leading to surface imperfections on the extrudate surfaces. Such imperfections, commonly called melt fracture, appear in different forms. The so-called "sharkskin" fracture occurs at lower shear rates and appears as a general, finely-structured and uniform roughness. In a blown-film extrusion sharkskin fracture may appear as an undesirable herringbone pattern, reducing clarity and giving a dull surface. In practice this may occur at uneconomically low extrusion rates. At higher shear rates flow often becomes unstable and a non-uniform stick-slip melt fracture results, wherein alternating bands of glossy surface and sharkskin fracture appear. This behavior is especially undesirable in wire coating and in tube and pipe extrusions as well as in blown-film applications. Other well-known problems that create difficulties in extrusion include fluctuations in barrel and die pressure, torquing out because of the excessively high pressure reached during a fluctuation, and accumulation of degraded polymer at the die exit orifice.

In an effort to improve the extrusion behavior of polymer resins through metal dies it is known to coat the die surfaces that contact the flowing polymer melt with a slip agent, such as tetrafluoroethylene polymers and copolymers, as in Japanese Application Publication Kokai 55-82784 (Mitsui Petrochem. Ind., KK), but bonding to the metal is poor, and over a period of time in use the slip layer is depleted and melt fracture resumes.

In other practices, as for example in the extrusion of certain hydrocarbon polymers and copolymers, it is known to employ small amounts of fluorocarbon polymers, blended with the extrusion resin, as a continuously replenishing slip agent. Thus Blatz, in U.S. Pat. No. 3,125,547, discloses hydrocarbon polymer compositions having improved extrusion behavior that contain small amounts of fluorocarbon polymers that are above their glass transition temperature, if amorphous, or above their crystalline melting point (e.g. molten), if crystalline, at the process temperatures. Under these conditions the flow rate above which melt fracture occurs is greatly increased, and required extrusion pressures for a given extrusion rate are diminished. Takeshi and Inui in Japanese Examined Application Kokoku 70-30574 disclose continuous extrusion molding of polyethylene compositions containing small amounts of tetrafluoroethylene polymer (crystalline at process temperatures). Japanese Unexamined Application Kokai 1,074,247 describes the use of certain combinations of fluoropolymer process aids disclosed in U.S. Pat. No. 3,125,547, cited above. U.S. Pat. No. 4,904,735 discloses the use of combinations of fluoropolymers that are molten at process temperatures, such as fluoroelastomers, and those that are not molten at process temperatures, such as crystalline tetrafluoroethylene homopolymers and copolymers.

Japanese Examined Applications Kokoku 55543/1988 and 55544/1988 describe compositions comprising a thermoplastic resin and a fluoropolymer process aid having pendant $-SO_3M$ groups, where M is an alkali metal anion.

The important effect of polar functionality situated on the fluoropolymer chain has not been heretofore recognized. It is an objective of this invention to describe fluoropolymer compositions having effective concentrations of polar functionality and enhanced utility as process aids for the extrusion of difficultly-melt-processible polymers.

SUMMARY OF THE INVENTION

The invention herein provides a composition having excellent extrusion characteristics. The composition comprises a difficultly-melt-processible polymer and 0.002–0.5 wt. %, preferably 0.01–0.2 wt. %, of one or more fluoropolymers wherein the fluoropolymer has a fluorine to carbon ratio of at least 1:2, preferably at least 1:1.5, and has chain ends bearing one or more functional groups W, wherein W is selected from $-COF$, $-SO_2F$, $-SO_3M$, $-OSO_3M$, $-COOR$ and $-COOM$, wherein R is a $C_{1-3}$ alkyl group and M is hydrogen, a metal cation, preferably an alkali or alkaline earth metal cation, or a quaternary ammonium cation. More specifically, the fluoropolymer is selected from the group consisting of (i) irradiated polytetrafluoroethylene, (ii) a partially crystalline copolymer of tetrafluoroethylene and a perfluoro(alkyl vinyl ether) or a perfluoroolefin containing 3-8 carbon atoms, (iii) an elastomeric copolymer of tetrafluoroethylene and a perfluoro(alkyl vinyl ether), (iv) a copolymer of vinylidene fluoride, hexafluoropropylene and tetrafluoroethylene and (v) a copolymer of one or more fluoroolefins and 0.5–40 mole % of a functional-group-containing monomer

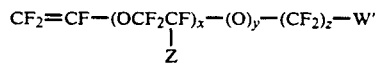

wherein Z is $-F$ or $-CF_3$, x is 0 or an integer of 1–4, y is 0 or 1, z is an integer of 1–12, and W' is selected from the functional groups $-SO_2F$, $-SO_2Cl$, $-SO_3H$, $-COOR$ or $-COOM$, wherein R is $C_{1-3}$ alkyl and M is hydrogen, a metal cation, preferably an alkali metal cation, or a quaternary ammonium cation, said fluoropolymer containing at least 100 functional groups W per million carbon atoms.

The end-group functionality, W, can be introduced into the fluoropolymer process aid, for example: (1) as polymer chain end groups during polymerization, or (2) by subjecting polymer without the end groups to ionizing radiation.

BRIEF DESCRIPTION OF THE FIGURES

FIGS. 1-4 are representative of the invention as applied to a difficultly-melt-processible linear low density polyethylene, as described in Examples 1-8 and Comparative Examples 1 and 3. FIG. 5 is similarly representative for polystyrene, as described in Example 9. FIG. 6 is similarly representative for an ethylene/vinyl acetate copolymer, as described in Example 10. FIG. 7 is similarly representative for a polyamide, as described in Example 13.

DETAILED DESCRIPTION OF THE INVENTION

Figure 1:
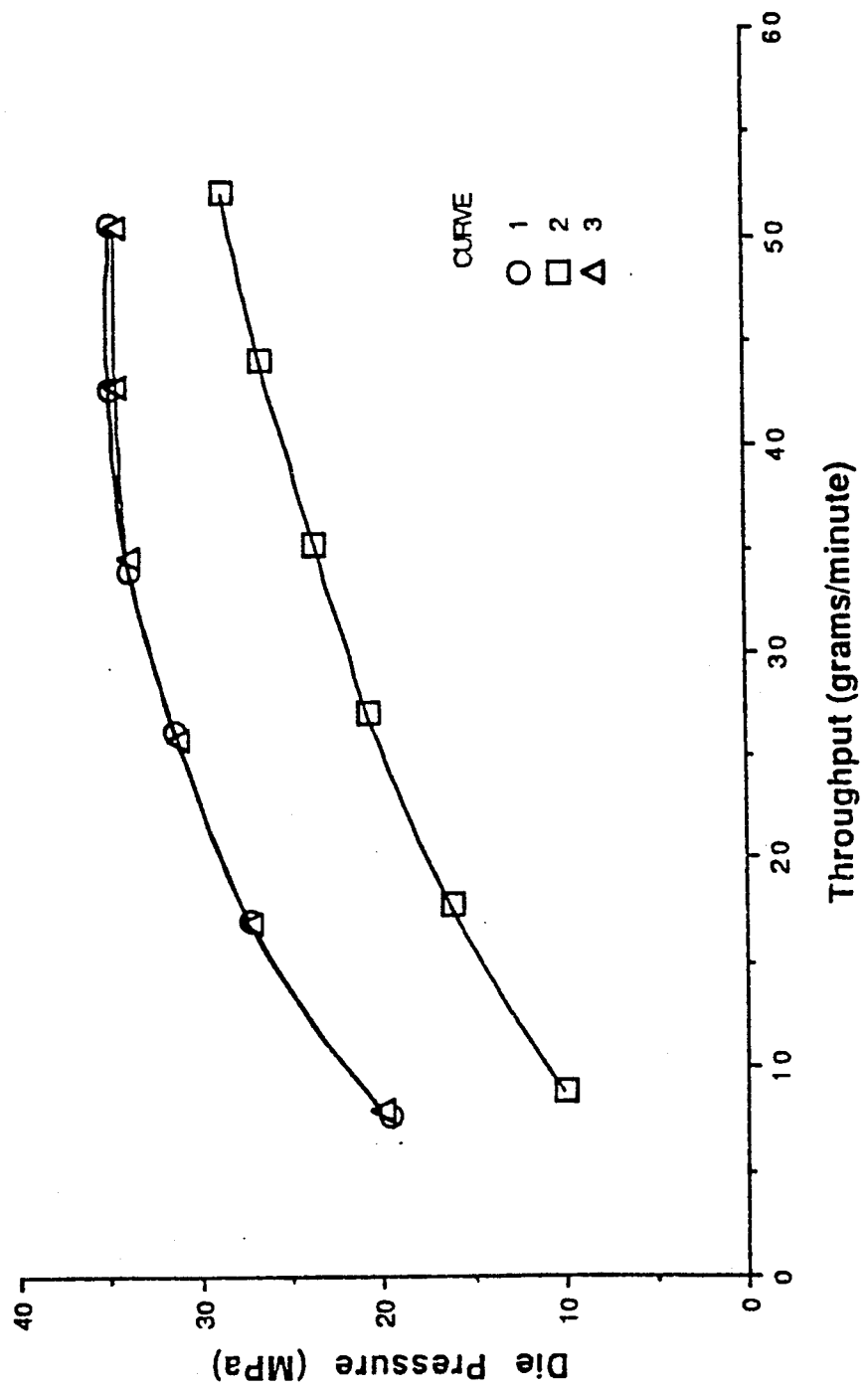
FIGS. 1-7 are plots of extrusion die pressure (MPa) vs. throughput (g/minute) of difficulty-melt-processible polymers, with and without process aids of the invention, as demonstrated in the examples provided hereinafter. More specifically.

This invention relates to fluoropolymers having utility in improving the extrusion behavior of difficultly-melt-processible polymer resins.

The term "extrusion behavior" used herein is intended to include, individually or in combination, such parameters as the die pressure reached during extrusion and the resultant power requirements, the operating melt temperatures required, and the maximum extrusion rates that can be achieved while maintaining melt stability and good extrudate surface quality.

Still further examples of poor extrusion behavior which may be overcome by means of this invention include the formation of deposits of extruding polymer resin, decomposed polymer and/or components of the resin around the die exit (orifice); uneven pumping of the polymer melt, resulting in fluctuations in pressure and output and a resulting surging of the polymer melt; and torquing out of the extruder, that is, automatic shutting down of the extruder because of the high pressure buildup, exceeding safety limits, during peaks of pressure surges.

Yet another measure of "extrusion behavior" resides in the efficient use of the fluoropolmer process aid, that is in the amount that may be required for noticeable and economically useful improvement in extrusion properties to be observed.

Difficultly-melt-processible polymers are defined as those that require uneconomically high extrusion pressures (high power requirement) or temperatures for extrusion; that extrude with unacceptable melt fracture, such that the surfaces of the extrudate are blemished under conditions that would be otherwise technically feasible or economically attractive; or that otherwise show poor extrusion behavior such as described above.

A number of critical requirements must be met for the fluoropolymer process aids of this invention to function well. The fluoropolymer must be incompatible in the difficultly-melt-processible resin. In addition, the fluoropolymer must disperse, and remain dispersed, in the resin without coagulation into large agglomerates that cannot be readily coated onto the die surfaces. Furthermore, the process aid must be capable of forming an adhering layer under the extrusion conditions of temperature and pressure in order to form a slip surface on the polymer-contacting regions of the die. In contrast to the teachings of the prior art, the process aid need not necessarily be above its crystalline melting point or glass transition temperature at the process temperature, so long as it is capable of forming a slip layer at the die surface under the shear stress conditions generated in the extrusion, controlled by the viscosity of the difficultly-melt-processible polymer, the extrusion rate and the prevailing temperature. Thus, certain melt-processible polymers and copolymers of tetrafluoroethylene having melting points as much as 40°-130° C. higher than the process temperatures are good process aids when all other requirements are met. It is also important that the fluoropolymer process aid be thermally and chemically stable at the melt processing temperature of the polymer resin.

On the other hand, standard, commercially available high molecular weight non-melt-processible polytetrafluoroethylene homopolymers, whether dispersion-produced or suspension-produced, are not film-forming under extrusion conditions and, therefore, are not within the scope of this invention.

The fluoropolymer process aid of this invention should have a high fluorine content, such that the fluorine to carbon ratio is at least 1:2, preferably at least 1:1.5, so that the die-coating film will have a low critical surface energy. Resultantly, there is little wetting of the fluoropolymer by the difficultly-melt-processible resin, and the coated die surface is thereby rendered less resistant to the flow of the polymer melt.

Finally, it has now surprisingly been discovered that it is essential that the fluoropolymer have an effective amount of polar functionality to bond the process aid to the metal or metal oxide die surface through chemical and/or physical interaction. Suitable polar groups include sulfonic or carboxylic groups of the type disclosed hereinbelow, and may be situated on the polymer chain ends as a result of the polymerization procedure or by a post-polymerization treatment step, or they may be randomly located along the polymer chain as part of a polar-group-containing copolymerized monomer.

For example, copolymers of tetrafluoroethylene and hexafluoropropylene having high concentrations of polar polymer chain end groups are excellent process aids for difficultly-melt-processible resins (see Example 1). These polymers are prepared in aqueous polymerization systems using inorganic peroxide initiators that provide —COOH or —COF polymer chain end groups. In contrast, when such polar end groups are removed by a humid heat treatment in isolation, as is common in commercial practice, as disclosed in U.S. Pat. No. 3,085,083, or by a fluorination reaction, as disclosed in U.S. Pat. No. 4,742,122, these compositions no longer function as effective process aids (see Comparative Examples 1 and 2).

Accordingly, the fluoropolymer process aids of this invention are defined as those that have a molecular weight of at least 10,000, have a fluorine to carbon ratio of at least 1:2, preferably at least 1:1.5, are capable of forming a slip layer coating at the die surface and have chain ends bearing one or more functional groups, W, wherein W is selected from —COF, —SO$_2$F, —O-SO$_3$M, —SO$_3$M, —COOR and —COOM, wherein R is a C$_{1-3}$ alkyl group, and M is hydrogen, a metal cation, preferably an alkali or alkaline earth metal cation, or a quaternary ammonium cation. The concentration of the functional group, W, should be at least 100 groups per million carbon atoms (pmc), preferably at least 200 groups pmc. It may be advantageous to use in combination more than one of the process aids of the invention. As already recited hereinabove, the concentration of the process aid in the difficultly-melt-processible polymer is 0.002-0.5 wt. %, preferably 0.01-0.2 wt. %.

In one important embodiment of this invention, the fluoropolymer process aid is a homopolymer or copolymer of tetrafluoroethylene having a high concentration of polar functional polymer chain end groups that are introduced as a consequence of the polymerization method employed. Such polymers include the following: melt-processible, partially crystalline copolymers of tetrafluoroethylene and 2-20 mole % of at least one perfluoroolefin of 3 to 8 carbon atoms, preferably hexafluoropropylene, prepared, for example, according to U.S. Pat. No. 2,946,763, preferably without a buffer to ensure the presence of —COOH end groups; partially crystalline copolymers of tetrafluoroethylene and perfluoro(alkyl vinyl ether), preferably the propyl vinyl ether, prepared, for example, by an aqueous process according to U.S. Pat. No. 3,635,926 and having, for the most part, —COOH end groups, or by a non-aqueous process, for example, according to U.S. Pat. No. 3,642,742 and having, for the most part, —COF end groups, the disclosures of all of which are incorporated herein by reference. The concentrations of —COF and —COOH groups in such polymers can be measured by the infrared method described hereinbelow.

As used herein, the term "partially crystalline" means that the fluoropolymer is melt processible, and has a crystalline melting point above room (ambient) temperature, as distinguished from the uncured fluoroelastomers described below, which will normally have melting points or glass transition temperatures below room (ambient) temperature. Such elastomers are often available as articles of commerce. It is to be understood that small changes of the monomer ratios in such polymers may cause them to have crystallinity that prevents their utility as elastomers, without detracting from their utility as fluoropolymers in the compositions and processes of this invention.

Uncured fluoroelastomers having utility as process aids in the invention include elastomeric copolymers of vinylidene fluoride and one or more fluorine-containing comonomers. Such fluoroelastomers are exemplified by the following: copolymers of vinylidene fluoride and a monomer selected from hexafluoropropylene, chlorotrifluoroethylene, 1-hydropentafluoropropylene and 2-hydropentafluoropropylene; copolymers of vinylidene fluoride, tetrafluoroethylene and hexafluoropropylene or 1- or 2-hydropentafluoropropylene; and copolymers of vinylidene fluoride, hexafluoropropylene and a perfluoro(alkyl vinyl ether). Such copolymers can be prepared in aqueous emulsion polymerization systems using inorganic initiators, such as described in U.S. Pat. Nos. 2,986,649 and 3,051,677. Other useful fluoroelastomers include perfluoroelastomers comprised of tetrafluoroethylene and a perfluoro(alkyl vinyl ether), preferably perfluoro(methyl vinyl ether), such as are disclosed in U.S. Pat. Nos. 3,132,123 and 4,281,092. Elastomeric copolymers of tetrafluoroethylene and propylene, optionally with a small amount of vinylidene fluoride, also have utility herein.

Fluoropolymer elastomers that are prepared in aqueous emulsion polymerization systems will have predominantly —OSO$_3$H and —COOH polymer chain end groups, when thermal initiation is employed, as well as —SO$_3$H end groups, when redox initiation systems are used. (See Logothetis, Prog. Polym. Sci., Vol. 14, pp 257,258 [1989]). The emulsions can be coagulated by addition of salts, such as sodium chloride, magnesium sulfate or aluminum sulfate, and depending on the pH during isolation, the free acids may be present in admixture with their corresponding metal salts.

In a further embodiment of the invention, the fluoropolymer process aid can comprise a tetrafluoroethylene homopolymer or a copolymer of tetrafluoroethylene and a perfluoro monomer selected from hexafluoropropylene and a perfluoro(alkyl vinyl ether), that has been subjected to sufficient ionizing radiation, for example, by a method such as disclosed in U.S. Pat. No. 3,766,031, to provide the end groups necessary to achieve the beneficial effects of the invention. It has been found that this may be achieved by employing, for example, 8-80 megarads, preferably 15-80 megarads, of ionizing radiation. Such treatment generates both —COF and —COOH groups, usually accompanied by at least some backbone scission and reduction in molecular weight. If such ionizing radiation treatment results in substantial crosslinking, the crosslinked fluoropolymer is less desirable as a process aid and, if crosslinking is extensive, it may be inoperable in this invention.

In yet another important embodiment of the invention the fluoropolymer process aid with polymer chain end groups can comprise a copolymer of tetrafluoroethylene and 0.5-40 mole %, preferably 4-40 mole %, of a functional-group-containing monomer

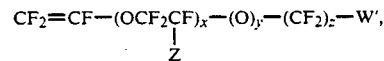

$$CF_2=CF-(OCF_2CF)_x-(O)_y-(CF_2)_z-W',$$
$$|$$
$$Z$$

wherein Z is —F or —CF$_3$, x is 0 or an integer of 1-4, y is 0 or 1, z is an integer of 1-12, and W' is —SO$_2$F, —SO$_2$Cl or —COOR, wherein R is C$_{1-3}$ alkyl, such as are described in U.S. Pat. Nos. 3,282,875, 3,506,635, 3,718,627, 4,065,366, 4,138,426, 4,178,218, 4,487,668 and British Patents 2,053,902, and 1,518,837 or wherein W' is —SO$_3$H or —COOM wherein M is hydrogen, a metal cation, preferably an alkali metal cation or a quaternary ammonium cation, for example, tetraalkylammonium, and is derivable from the alkyl halides and esters by acid or base hydrolysis. In preferred compositions of this embodiment Z is —CF$_3$, x: and y are each 1, z is 1-5, preferably 2, and W' is —SO$_2$F, —CO$_2$CH$_3$, —SO$_3$H or —COOM.

Examples of difficultly-melt-processible polymers that are within the purview of the compositions and processes of the invention include but are not limited to mono-olefin polymers; vinyl aromatic polymers, such as polystyrene; copolymers of alpha-olefins, particularly ethylene, and one or more monomers selected from vinyl esters, such as vinyl acetate or vinyl propionate, (meth)acrylic esters, such as ethyl or methyl acrylate, (meth)acrylic acids and their (ionomeric) metal salts, and acrylonitrile; chlorinated polyethylene; polyvinyl chloride; polyamide; and polyester. Blends or alloys of the above difficultly-melt-processible polymers may also be employed in the compositions and processes of the invention. As used herein, the term "alloy" is intended to describe compositions obtained by melt compounding of polymeric components containing co-reactive functional groups. As an example of such an alloy is an alloy comprised of a polyamide 6/6, an ethylene/n-butyl acrylate/methacrylic acid copolymer and an ethylene/n-butyl acrylate/glycidyl methacrylate copolymer.

When the difficultly-melt-processible polymer is a hydrocarbon polymer that is used, for example, in blown film extrusion, it will generally have a melt index (ASTM D-1238) at 190° C. of 5 or less, preferably 3 or less. For high shear melt processing, such as fiber extrusion or injection molding, even higher melt index resins, for example, having a melt index of 20 or more, may suffer extrusion difficulties.

In the case of a hydrocarbon polymer, it may comprise an elastomeric copolymer of ethylene and propylene and, optionally, a non-conjugated diene monomer, for example, 1,4-hexadiene, or, in general, any thermoplastic hydrocarbon polymer obtained by the homopolymerization or copolymerization of a monoolefin(s) of the formula $CH_2=CHR'$, wherein $R'$ is H or an alkyl radical, usually of not more than eight carbon atoms. In particular, this invention is applicable to the following: polyethylene, both of the high density type and the low density type having densities within the range 0.89 to 0.97; polypropylene; polybutene-1; poly(3-methylbutene); poly(methylpentene); and linear low density copolymers of ethylene and an alpha-olefin such as propylene, butene-1, hexene-1, octene-1, decene-1, octadecene and 4-methylpentene-1.

Difficultly-melt-processible polyesters are condensation polymers derived from dicarboxylic acids and dialcohols and/or from hydrocarboxylic acids or the corresponding lactones, such as polyethylene terephthalate, polybutylene terephthalate and poly-1,4-dimethylolcyclohexane terephthalate.

Difficultly-melt-processible polyamides and copolyamides are derived from diamines and dicarboxylic acids and/or amino carboxylic acids or the corresponding lactams, such as polyamide 6, polyamide 6/6, polyamide 6/10, polyamide 11 and polyamide 12.

As mentioned above, it will be recognized by those skilled in the art that for those resins that extrude at high temperatures and, in addition, are chemically sensitive, for example polyester or polyamide, it is important to select fluorocarbon process aids that are thermally and chemically stable at the process temperatures. Generally speaking, such polymers are those that are very nearly perfluorinated, such as homopolymers of tetrafluoroethylene or copolymers of tetrafluoroethylene and other perfluoroolefins. Copolymers of vinylidene fluoride and hexafluoropropylene, for example, may dehydrohalogenate at temperatures in excess of about 250° C. and are of lesser utility under these conditions.

The invention is also applicable to difficultly-melt-processible polymers containing pigments and antiblock agents, such as silica, clays and glass beads. Light stabilizers, antioxidants and other common additives may also be incorporated therein.

Because of the different extrusion characteristics of the various polymers operable herein, the utility of the process of this invention may be of greater value with some polymers than with others. Thus, for example, hydrocarbon polymers, such as polypropylene or branched polyethylene, that are not of high molecular weight, have good melt flow characteristics even at low temperatures, so that surface roughness and other surface defects can be avoided by adjustment of extrusion conditions. Such hydrocarbon polymers may not require the use of the process aid of this invention, or be noticeably improved by it, except under unusual, adverse extrusion conditions. However, other polymers, such as high molecular weight, high density polyethylene or linear low density polyethylene copolymers, and high molecular weight, polypropylene and propylene-/alpha-olefin copolymers, particularly those with narrow molecular weight distributions, do not have this degree of freedom in the variation of extrusion conditions and it is particularly with these resins that remarkable reductions in extrusion pressure and/or improvements in the surface quality of the extruded product are obtained by the composition and process of the invention.

Although not wishing to be bound by the following, it is postulated that there is an interaction, chemical and/or physical, between the polar end groups or midchain polar structures, if present, and the polymer-contacting metal surfaces of the extruder, particularly within the die land area, thus causing the formation of an adherent die-coating layer of low surface energy fluoropolymer; and that bonding or attraction between polymer and metal occurs at metal-oxygen bonds on the die surfaces.

It will be recognized by one skilled in the art that it may not be possible to achieve, simultaneously, reduced die pressure, increased throughput and improved surface quality to the maximum extent at a given concentration of fluoropolymer process aid. Thus, one might elect to attain maximum improvement in one parameter at the expense of corresponding improvements in other parameters. For example, increased output of extrudate with high quality surface characteristics may not necessarily be accompanied by reduced die pressure. Similarly, in some systems substantial reductions in operating die pressures are achieved, but without significant improvements in extrudate surface qualities. Reductions in pressure fluctuations or elimination of die buildup may be achieved, but without further improvements in surface quality. Alternatively, and for matters of operating economies, it may be desirable to operate at very low levels of fluoropolymer process aid rather than to achieve the maximum improvements in extrusion parameters achievable at higher concentrations. The best set of conditions will be determined by the specific requirements of the extrusion.

The addition of the fluorocarbon polymer process aid to the difficultly-melt-processible polymer can be accomplished by any of the means heretofore developed for the addition of modifiers to such polymers. The fluorocarbon polymer may be added, for example, to a hydrocarbon polymer on a rubber compounding mill or in a Banbury or other internal mixer or in a mixing extruder. When the fluoropolymer process aid is a non-massing powder, it is also feasible to dry-blend the fluoropolymer process aid with the host polymer in the solid state, and then effect uniform distribution of the fluoropolymer in the melt extruder employed in the fabrication by using an extruder screw with good mixing capability.

Alternatively, in some cases, masterbatch dispersions of the fluoropolymer process aid in a diluent polymer can be metered to the feed section of the extruder by appropriate devices or dry-blended with the host polymer prior to extrusion. Exceptions to this practice may apply with fluoropolymer process aids that are not necessarily melted at extrusion process temperatures. When such process aids are heated to higher temperatures in the masterbatch-forming process, under which conditions fluoropolymer particles may coalesce to larger particles, they are not appropriately subdivided in the final extrusion of the difficultly-melt-processible polymer. The diluent polymer can be a difficultly-meltprocessible polymer, or it can be a melt-processible polymer that does not substantially deleteriously affect the interaction of the aforesaid fluoropolymer process aid with the metal surfaces of the extrusion die. For example, when the difficultly-melt-processible polymer is linear low-density polyethylene, the diluent polymer can be a melt-processible hydrocarbon polymer, such as a homopolymer or copolymer of a monoolefin(s) of the formula R'CH=CH$_2$ wherein R' is H or an alkyl radical, usually of not more than eight carbon atoms.

In the practice of this invention, it will be found that the beneficial effects in the reduction of extruder die pressures and improvement in the rates of extrusion that may be employed without encountering melt fracture are not necessarily observed immediately on the onset of extrusion, and depending on the overall concentrations of modifier, it may take from 10 minutes to 8 hours to reach stable extrusion rate and die pressure. Longer times are required at low concentrations of fluoropolymer process aid and with process aids having lower concentrations of the functional group W. When it is desirable to hasten the achievement of equilibrium, it may be expedient to first "condition" the extruder rapidly using a composition containing 0.5-2 parts of the fluoro polymer and then to switch to the desired lower concentration of process aid.

The concentration of the polar functional groups in the perfluoropolymer process aid of the invention may be determined from the infrared spectrum of compression-molded films, according to the technique described in U.S. Pat. Nos. 4,742,122 and 3,085,083, as follows:

The quantitative measurement of the number of end groups is obtained using the absorptivities measured on model compounds containing the end groups of interest. The end groups of concern, the wavelengths involved, and the calibration factors determined from model compounds are shown below:

| End group | Wavelength, micrometers | Calibration Factor (CF) |
|---|---|---|
| —COF | 5.31 | 406 |
| —CO$_2$H(M) | 5.52 | 335 |
| —CO$_2$H(D) | 5.64 | 320 |
| —CO$_2$CH$_3$ | 5.57 | 368 |
| —CONH$_2$ | 2.91 | 914 |
| —CF=CF$_2$ | 5.57 | 635 |
| —CH$_2$OH | 2.75 | 2220 |

(M) = Monomeric. (D) = Dimeric

The calibration factor is a mathematical conversion to give end group values in terms of ends per 10$^6$ carbon atoms. The concentration of each type of end in a polymer film may generally be obtained from this equation:

$$\frac{\text{End Groups per}}{10^6 \text{ carbon atoms}} = \frac{\text{absorbance} \times CF}{\text{film thickness}}$$

where film thickness is in millimeters.

Some of the absorbance peaks may interfere with one another when —CO$_2$H(D), —CO$_2$H(M), and —CF=CF$_2$ ends are all present. Corrections have been developed for the absorbances of —CO$_2$H(D) (hydrogen-bonded carboxylic acid dimer) and the —CF=CF$_2$ ends. These are as follows (where $\mu$ is the wavelength in micrometers):

$$\frac{\text{absorbance } 5.46\mu - (0.3 \times \text{absorbance } 5.58\mu)}{0.91} =$$

the corrected absorbance for —CO$_2$H(D)

$$\frac{\text{absorbance } 5.57\mu - (0.3 \times \text{absorbance } 5.58\mu)}{0.91} =$$

the corrected absorbance for —CF=CF$_2$

The presence of —CONH$_2$ or —CO$_2$CH$_3$ may also interfere with the acid and —CF=CF$_2$ absorbances. Since these groups are generally the result of additives to polymerization, their presence is generally predictable. A suspicion of —CONH$_2$ absorbance in the vicinity of 5.6 micrometers can be checked by searching for the auxiliary —CONH$_2$ band at 2.91 micrometers.

The polymer films (0.25 to 0.30 mm thick) are scanned on a Perkin-Elmer 283B spectrophotometer with a film of the same thickness, and known to contain none of the ends under analysis, in the instrument reference beam. The instrument is set up with a Response Time setting of 1, a Scan Time setting of 12 minutes, Ordinate Expansion of 2, a Slit Program of 7, and an Auto-Chek Gain control of 20%. The films are then scanned through the pertinent regions of the spectrum making sure that adequate base lines are established on each side of the pertinent absorbances.

The polymer films are generally compression molded at 270°-350° C. The presence of certain salts, particularly alkali metal salts, may cause end group degradation within this temperature range. If these salts are present, the films should be molded at the lowest possible temperature.

Note that this method is calibrated for use with perfluoropolymers. If the carbon to which the functional group is attached contains hydrogens, there will be some shifts in absorption wavelengths and calibration factors, as will be apparent to those skilled in the art.

EXAMPLES

Examples 1-8 that follow were carried out with a C. W. Brabender Instruments, Inc. Computerized Plasti-Corder equipped with a 19.1 mm. (¾ in.) diameter extruder with a 25/1 length/diameter ratio. The chromium plated screw had ten feed flights, 10 compression flights with a compression ratio of 3:1, and 5 metering flights. Operating parameters were controlled by four or five independent heating zones, depending on the die, two pressure transducers and a torque-measuring drive unit with 1-120 rpm capability. The instrument was equipped with software for rheometric extrusion testing. One of two die assemblies was used, as noted in the examples, a standard nitrided #416 stainless steel capillary die with a diameter of 2 mm. and L/D of 20, or a horizontal ribbon (tape) die body made of #416 ferritic stainless steel, supplied by C. W. Brabender and designed to accept chromium plated die inserts such that the exit width was 2.54 cm. (1.0 in.), the land length was 1.016 cm. (0.4 in.) and the die gap was a nominal 0.508 mm. (0.02 in.). The various new die inserts were used as received after wiping with ScotchBrite ® scouring pads and acetone to remove surface contaminants.

In operation, the required machine conditions were set and the polymer resin then extruded, usually at 40 rpm when using the capillary die, and 60 rpm when using the tape die, until equilibrium (constant throughput and constant die pressure) was reached. Experiments were carried out in a sequence of unmodified resin, followed by resin containing fluoropolymer process aid. When changing the feed composition, the initial output parameters corresponded to the previous equilibrium, and then gradually changed to a new equilibrium. In some of the examples that follow, when switching from unmodified hydrocarbon polymer to the blend containing fluoropolymer process aid, a "conditioning" operation using a 1% blend of fluoropolymer process aid was first used for 30 min. to speed the attainment of equilibrium, and then the feed was switched to a blend containing the desired test concentration of fluoropolymer process aid. Equilibrium was achieved for each composition, and a range of screw speeds was run to produce new equilibrium values of throughput and die pressure. Surface quality of the extrudate was judged by visual examination.

After each series of examples the die inserts were removed, and the die body and extruder were purged with one of several materials, such as PCX-12 purge compound (available from Du Pont Canada), Du Pont 3535 polyethylene 1 melt index linear low density polyethylene (LLDPE), or LLDPE containing 20% silica. Replacement die inserts were installed. After calibration of the transducers, the unmodified resin was run to establish equilibrium conditions, and to assure that reliable output was being obtained. If previously established equilibrium values for unmodified resin were not achieved, the cleanout procedure was repeated. Because combinations of small amounts of fluoroelastomer and fluororesins can act synergistically, the extruder was cleaned extremely well following any use of fluoroelastomer using the following procedure. The extruder and die body were purged as above and then completely disassembled. The screw, barrel, die assembly, transducers and thermocouples were thoroughly cleaned, first with a motor driven brass brush, and finally with acetone solvent. An extrusion test for equilibrium parameter values was then carried out as described above.

The linear low density polyethylene, LLDPE, used in the following examples was a high molecular weight, linear low density (d=0.918) copolymer of ethylene and butene-1 having a melt index (ASTM D-1238, cond. E) of 1.0.

Example 1

(A) To the extruder, equipped with a capillary die, was fed unmodified LLDPE with the screw operating at 40 rpm and heating zones No 1-5 controlling at nominal temperature settings of 150, 180°, 200° and 204° and 205° C., respectively. Equilibrium extrusion conditions, where throughput and die pressure were constant, were reached after a period of 30 min. The screw speed was then systematically varied from 20 rpm to 120 rpm. After determining the extrusion rate at various screw speeds, the data were used to generate a curve of die pressure vs. throughput such as is shown in FIG. 1 as Curve 1. Surface appearance of the die strand was evaluated visually. Melt fracture occurred at all extrusion rates in excess of 8 g./min., the lowest rate attainable on the equipment. For purposes of comparison, "melt fracture" is defined as a herringbone-like roughness on the surface of the extrudates.

(B) Without changing conditions, the extruder feed was changed to a blend containing 0.05 wt. % (500 ppm) of a copolymer (FEP) of tetrafluoroethylene and 12 wt. % of hexafluoropropylene having a melt viscosity of $10.3 \times 10^4$ poise and a DSC melting point maximum in the range 250°-280° C. It was in a powder form, prepared without humid heat treatment during isolation. By infrared analysis it was shown to contain approximately 420 carboxyl end groups per million carbon atoms and had essentially no —COF end groups. The die pressure decreased gradually, and after a total time of 120 min. following the switch to fluoropolymer blend, a new equilibrium was established. Extrusion was continued without any further die pressure changes, and after a total extrusion time of 210 min., a plot of die pressure vs. extrusion rate was generated as shown in FIG. 1, Curve 2. Melt fracture did not occur up to a maximum extrusion rate attainable of 52 g/min.

Comparative Example 1

A portion (50 g) of an FEP polymer powder similar to that used in Example 1 was placed in a chamber which was evacuated, purged with nitrogen, and then heated to 95° C. The chamber was again evacuated and pressured back up with nitrogen, evacuated again and then pressured back up with a 25/75 volume mixture of fluorine/nitrogen gases. The temperature was allowed to rise to 100° C. and the same gas mixture was passed through the reactor at 0.9 L/min. for 2 hrs. The temperature was raised to 185° C. while maintaining the same gas flow. After 1 hr. at 185° C. the gas flow rate was decreased to 0.7 L/min. The fluorine/ nitrogen flow was maintained at this level for 4 hrs. after the temperature was raised to 185° C. The total amount of fluorine passed through the reactor was calculated from the cylinder pressure change to be 0.8 gram per gram of polymer. The chamber was then purged with nitrogen, cooled to room temperature, and opened to obtain the treated polymer. The treated polymer was cold pressed into a film which was scanned by Infrared Spectroscopy. Using known IR absorptivities for —COF and —COOH structures in fluoropolymers, it was determined that the treated polymer contained 14 —COF ends per million carbon atoms and no —COOH ends. It had a melt viscosity of $9.94 \times 10^4$ poise.

LLDPE containing no fluoropolymer additive was extruded as described in Example 1, giving essentially equivalent results. Extrusion of LLDPE containing intimately blended therein 500 ppm of the above fluorine-modified FEP polymer was carried out as in Example 1. There was no drop in die pressure when the modified FEP was introduced, as shown by curve 3 in FIG. 1, and there was no improvement in melt fracture behavior compared to the unmodified LLDPE (curve 1).

Comparative Example 2

An FEP polymer was prepared in a fashion similar to that used in the preparation of the FEP sample of Example 1, except that it was subjected to a humid heat treatment in isolation, as described in U.S. Pat. No. 3,058,083. It had a melt viscosity of $7.8 \times 10^4$ poise and by infrared analysis had no detectable end groups. A blend of 1000 ppm of this polymer in LLDPE was evaluated as described in Example 1. There was no reduction in die pressure or improvement in melt fracture behavior for the blend, relative to the LLDPE not containing this fluoropolymer.

Comparative Example 3

This experiment was carried out as described in Example 1, except the tape die assembly was used and the four heating zones were controlled at 150°, 180°, 200° and 204° C., respectively. Using LLDPE not containing fluoropolymer process aid, the Control reference data shown in FIG. 2 as Curve 1 were obtained as described in Example 1.

Comparative Example 4

Using the procedures of Comparative Example 3 a blend of LLDPE containing 1000 ppm of intimately dispersed, commercially available, dispersion-process-polymerized, fibrillatible, non-melt-processible polymer of TFE containing a small amount of copolymerized hexafluoropropylene was evaluated; end group functionality was immeasurably low. There was no reduction in extruder die pressure or improvement in melt fracture behavior.

Example 2

Figure 2:
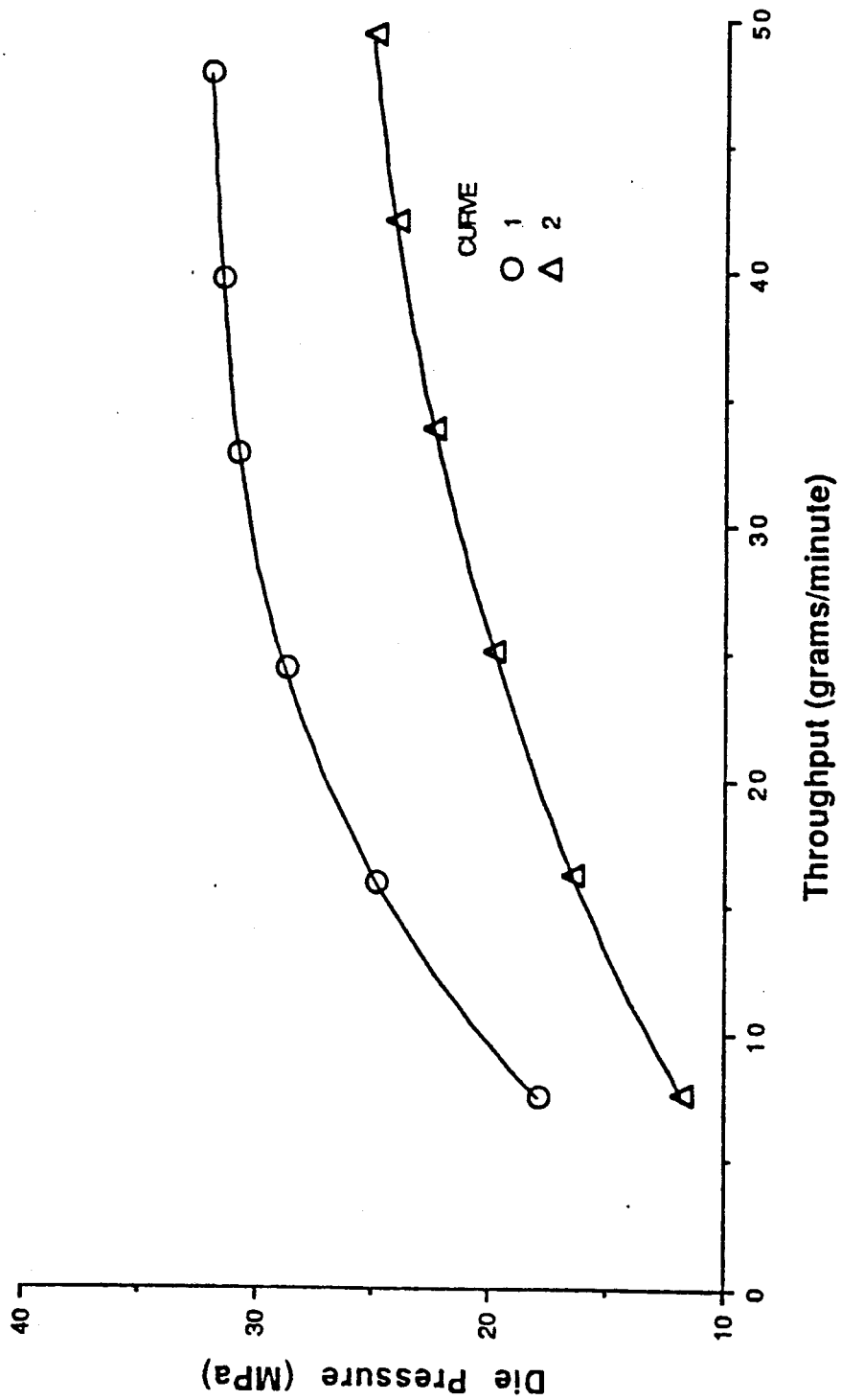

Using the procedure of Comparative Example 3 a blend of LLDPE containing 1000 ppm of a molecular weight, dispersion-produced PTFE, that had been subjected to 60 megarads of ionizing radiation and had 650 —COF and 1235 —COOH end groups per million carbon atoms and a DSC melting point of 321° C., was evaluated. There was a significant reduction in extruder die pressure, compared to the control, as shown in FIG. 2, Curve 2, and melt fracture occurred only at extrusion rates above 42 g/min.

Example 3

Figure 3:
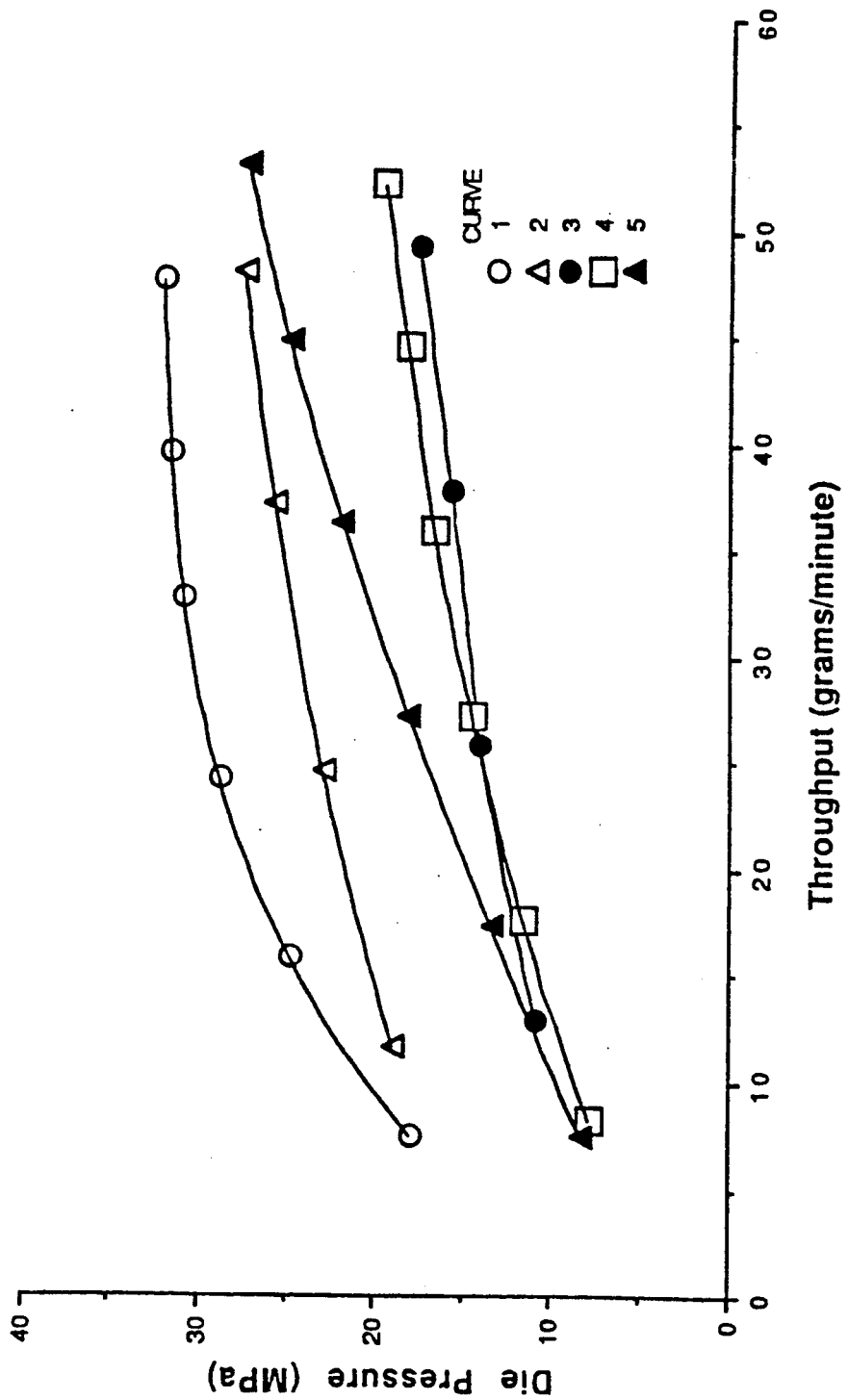

Using the procedure of Comparative Example 3 a blend of LLDPE containing dispersed therein 200 ppm of a copolymer of tetrafluoroethylene and 13.2 mole % of perfluoro-3,6-dioxa-4-methyl-7-octene sulfonic acid (Aldrich Chemical Co., Cat. No. 27673-1) was evaluated. The plot of die pressure vs. extrusion rate is shown in Curve 2 of FIG. 3 and is compared with the unmodified LLDPE control, Curve 1, which was generated in Comparative Example 3. Melt fracture had not occurred at extrusion rates of 48 g/min., the maximum extrusion rate achievable.

Example 4

Using the procedure of Comparative Example 3 a blend of LLDPE containing 200 ppm of the tetrafluoroethylene copolymer of Example 3 and 200 ppm of an FEP copolymer similar to that of Example 1, but having 456 —COF and —COOH end groups per million carbon atoms and a melt viscosity of $8.95 \times 10^4$ poise, was evaluated. Extrusion data are shown in Curve 3 of FIG. 3. Melt fracture had not occurred at an extrusion rate of 49 g/min., the maximum rate achievable.

Example 5

In a procedure like that of Comparative Example 3 a blend of LLDPE containing 400 ppm of a copolymer of tetrafluoroethylene and 13.7 mole % methyl perfluoro(4,7-dioxa-5-methyl-8-noneneoate) and 100 ppm of the FEP copolymer of Example 4 was evaluated. Extrusion data are shown as Curve 4 in FIG. 3. Melt fracture did not occur at extrusion rates below 48 g/min., the maximum rate achievable.

Example 6

In a procedure like that of Comparative Example 3 a blend of LLDPE containing 1000 ppm of a copolymer of tetrafluoroethylene and perfluoro-3,6-dioxa-4-methyl-7-octene sulfonyl fluoride was evaluated. The plot of die pressure vs. extrusion rate is shown in Curve 5 of FIG. 3. No melt fracture was observed up to the maximum extrusion rate tested, 53 g/min.

Example 7

A terpolymer having principally sulfonic end groups was prepared in a 4L mechanically agitated, water-jacketed, stainless steel autoclave operating continuously at 70° C. and 4800 kPa, into which was pumped, at a rate of 500 mL/h, an aqueous polymerization medium-/initiator solution comprised of 500 mL water and 6.7 g sodium sulfite and, at a rate of 600 mL/h, another aqueous solution comprising 600 mL water, 7.5 g ammonium persulfate and 15 g ammonium perfluorooctanoate. At the same time, tetrafluoroethylene (250 g/h), perfluoro(methyl vinyl ether) (325 g/h) and perfluoro(8-cyano-5-methyl-3,6-dioxa-1-octene) (8CNVE, 14.4 g/h) were fed to the autoclave as a compressed mixture at a constant rate by means of a liquid pump. Polymer latex was removed continuously by means of a let-down valve and unreacted monomers were vented. The latex, from about 5 hrs. operation, was added with stirring to a preheated (90° C.) coagulating solution consisting of 230 g magnesium sulfate in 25 L water. The coagulated crumb was filtered off, washed repeatedly with water and dried by heating in an air oven at 80° C. for 48 hrs. to give about 2300 g of polymer. The polymer composition (wt %) was 63% TFE, 35% PMVE and 2% 8CNVE as determined by infrared analysis.

Figure 4:
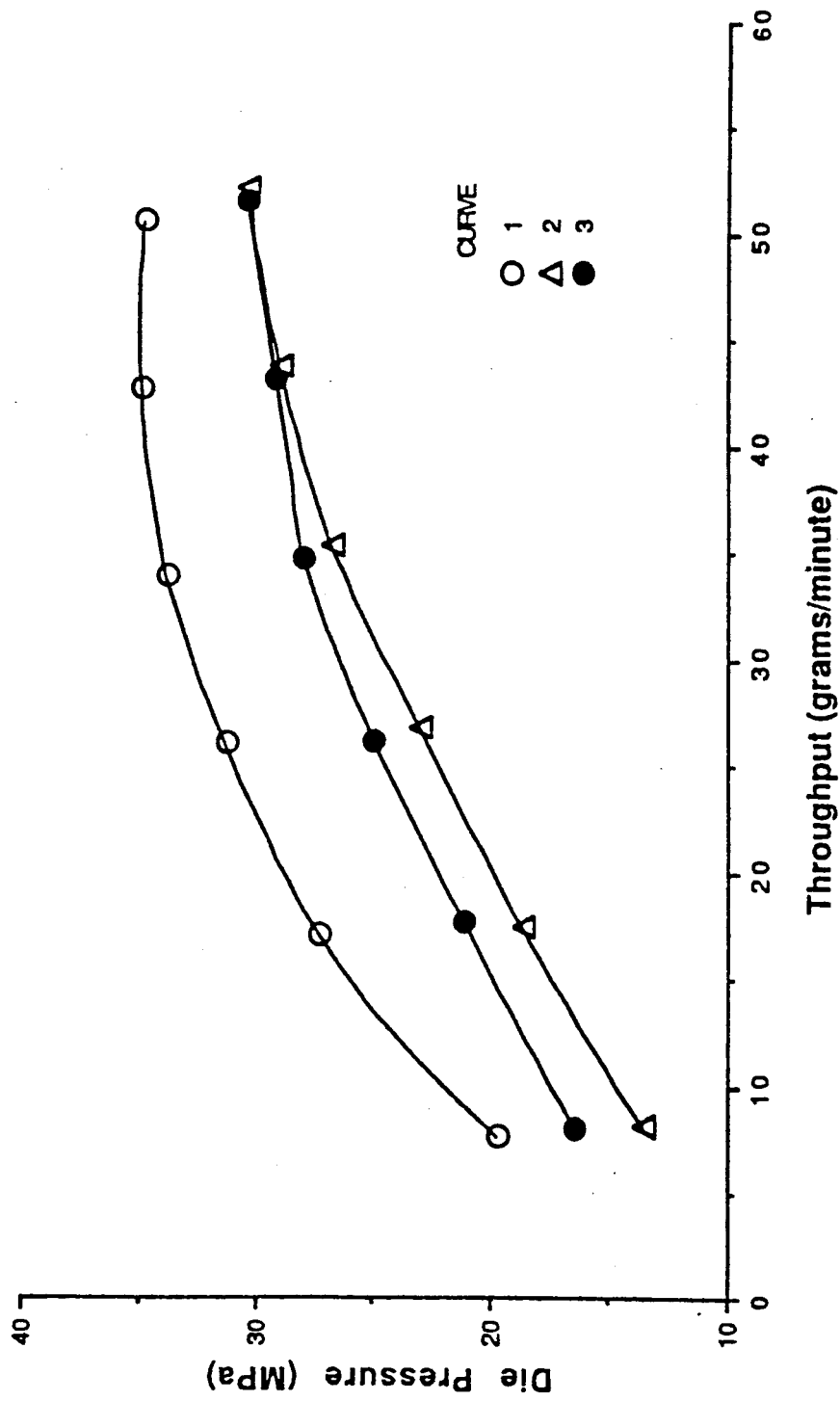

In a procedure like that of Example 1 a blend of LLDPE containing 1000 ppm of the above-prepared fluoropolymer was evaluated. Extrusion data are shown by Curve 2 of FIG. 4 and are compared with data for LLDPE containing no fluoropolymer process aid in Curve 1. Melt fracture did not occur at extrusion rates below 52 g/min., the maximum rate achievable.

Example 8

A terpolymer having principally carboxyl end groups was prepared in a 4L mechanically agitated, water-jacketed, stainless steel autoclave operating continuously at 90° C. and 4800 kPa, into which was pumped, at the rate of 1500 mL/h, an aqueous polymerization medium-/initiator solution comprising 1500 mL water, 3.85 g ammonium persulfate, 22 g of ammonium perfluorooctanoate ("Fluorad" FC-143, 3M Co.) and 22 g disodium hydrogen phosphate heptahydrate ($Na_2HPO_4.7H_2O$). At the same time, tetrafluoroethylene, TFE, (465 g/h), perfluoro(methyl vinyl ether), PMVE, (480 g/h) and vinylidene fluoride, $VF_2$, (3.0 g/h) were fed to the autoclave at a constant rate by means of a diaphragm compressor. Polymer latex was removed continuously by means of a let-down valve and unreacted monomers were vented. The latex, from about 4 hrs. operation, was added with stirring to a preheated (90° C.) coagulating solution consisting of 320 g magnesium sulfate in 25 L water. The coagulated crumb was filtered off, washed repeatedly with water and dried by heating in an air oven at 80° C. for 48 hrs. to give abut 3200 g of polymer. The polymer composition (wt %) was 64.8% TFE, 34.8% PMVE and 0.4% $VF_2$ as shown by infrared analysis.

In a procedure like that of Example 1 a blend of LLDPE containing 1000 ppm of the above-described fluoropolymer was evaluated. Extrusion data are shown by Curve 3 of FIG. 4. Melt fracture did not occur at extrusion rates below 42 g/min., the maximum rate achievable.

Comparative Example 5

In a procedure like that of Comparative Example 3, a blend of LLDPE and 1000 ppm of a commercially available (Du Pont Company) powdered, essentially alternating copolymer of tetrafluoroethylene and ethylene. It had a DSC melting maximum in the range of 250° C. Although acid or acid fluoride end groups of this fluoropolymer were is very low because of the high hydrocarbon concentration and the method of polymerization of the polymer (see U.S. Pat. No. 3,624,250). There was no die pressure drop relative to that of the LLDPE containing no fluoropolymer process aid, and melt fracture occurred at all extrusion rates above 16 g/min., the minimum rate tested.

Example 9

The equipment employed was a Haake Buchler Rheomix ® 19.1 mm (¾ in.) diameter single-screw extruder with a chromium plated one-stage metering screw having a 20/1 length/diameter ratio, 10 feed flights, 5 compression flights, 5 metering flights and a channel depth ratio of 3. Operating parameters were controlled by four independent heating zones, two pressure transducers and a torque-measuring drive with 1-200 rpm capability. The extruder was equipped with software for rheometric capillary extrusion testing. The capillary die, made from #416 stainless steel, had a diameter of 1.27 mm and a length of 39.1 mm and was previously unused. Prior to each use the extruder was thoroughly cleaned by first purging with linear low density polyethylene containing 20% silica. The extruder was then disassembled and each section was cleaned with a wire brush and then methyl ethyl ketone solvent. The die holder was cleaned by heating at 600° C. for 4 hrs.

Figure 5:
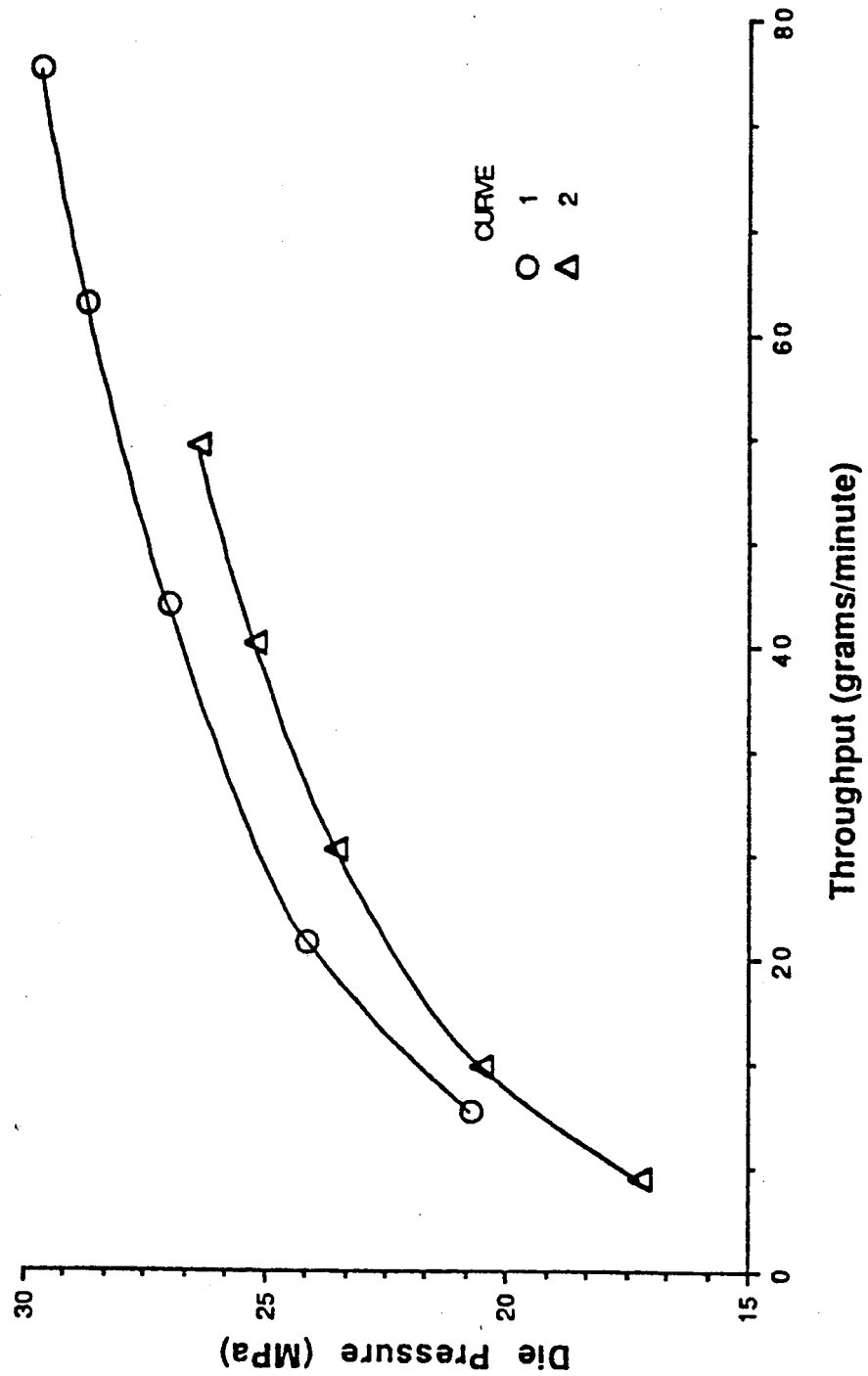

(A) A commercially available extrusion grade polystyrene, Styron ® 685D (Dow Chemical Co.), density 1.40 g/cc, melt flow rate 1.6 g/10 min., was fed to the extruder, equipped with a new die, with the screw operating at 5 rpm and heating zones 1, 2, 3, and 4 controlled at nominal settings of 150°, 180°, 200° and 204° C., respectively (No. 4 is closest to the die). Equilibrium extrusion conditions were achieved after 120 min. The screw speed was then systematically varied from 1 rpm to 120 rpm to generate, as previously described, the correlation of extruder throughput and die pressure shown in Curve 1 of FIG. 5. Melt fracture was not observed at any screw speed tested, but die buildup (collection of polymer at the exit of the capillary die) was observed at screw speeds greater than 60 rpm.

(B) Without changing conditions the feed was changed to a powder blend of polystyrene containing 0.05 wt. % of the irradiated PTFE described in Example 2. Using the procedure of Part A, a new equilibrium was established after 240 min., and the data of Curve 2 of FIG. 5 was generated. Die buildup was not observed at any screw speed.

Example 10

Figure 6:
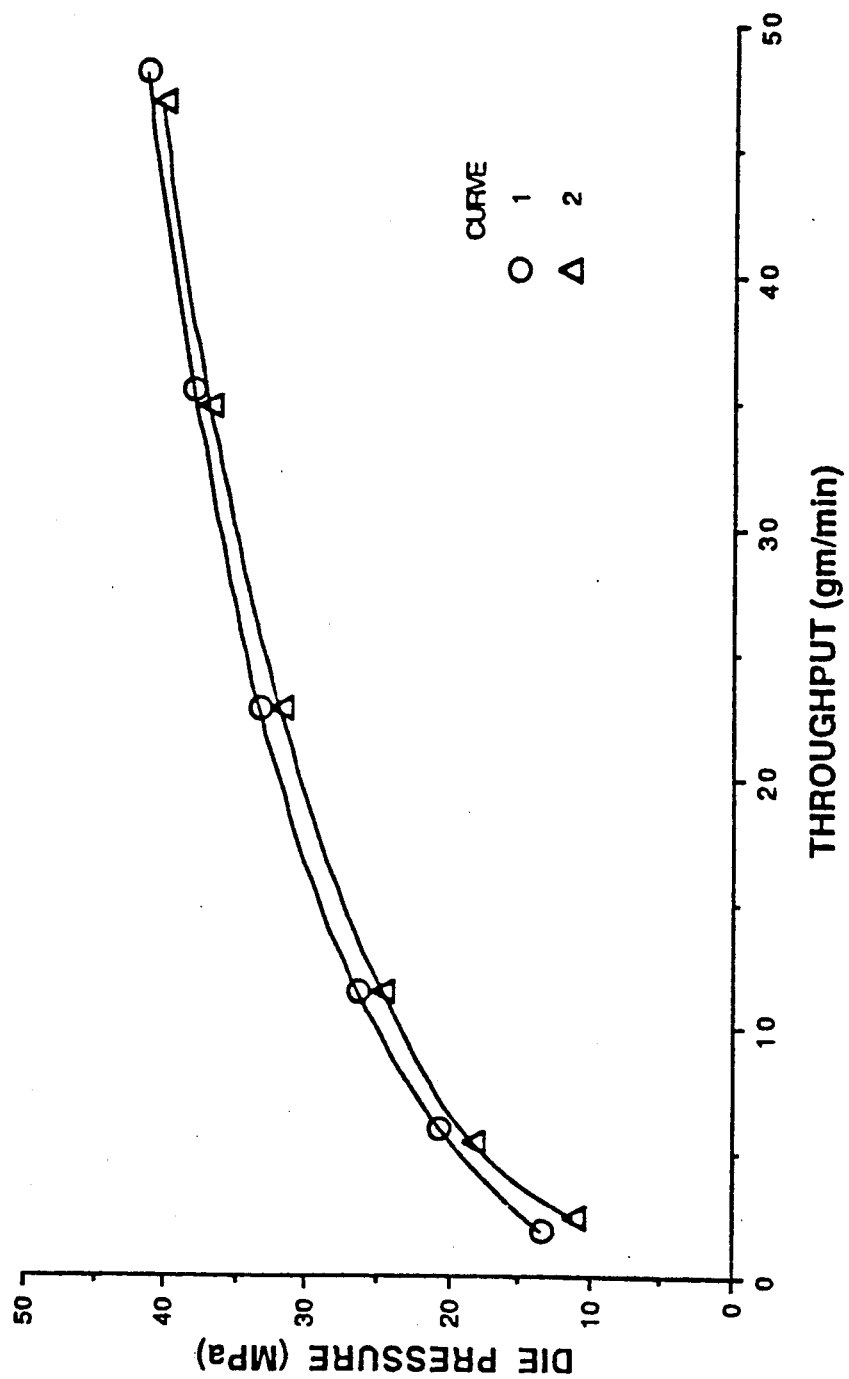

In a procedure like that of Example 9, except t hat the extruder heating zones Nos. 1, 2, 3 and 4 were controlled at nominal temperature settings of 160°, 180°, 220° and 220° C., respectively, the performance of an extrusion grade ethylene/vinyl acetate copolymer (Du Pont Elvax ®-3135), density 0.930 g/cc, melt index of 0.35 g/10 min., was evaluated. Curve 1 of FIG. 6 shows data for extrusion of unmodified EVA polymer. Curve 2 shows data for extrusion of a blend containing 0.05 wt. % cf a copolymer similar to that of Example 8 but comprised of 55.4 wt. % of tetrafluoroethylene, 44.2 wt. % perfluoro(methyl vinyl ether) and 0.4 wt. % vinylidene fluoride.

Example 11

(A) In a procedure like that of Example 9, except that the extruder heating zones Nos. 1, 2, 3 and 4 were controlled at nominal temperature settings of 280°, 310°, 310° and 310° C., respectively, the performance of an extrusion grade PET copolymer of ethylene glycol and terephthalic acid (Goodyear Co.), density 1.39 g/cc, inherent viscosity (0.05 wt. % in a 3/1 mixture of methylene chloride and trifluoroacetone)1.65, was evaluated. Die pressure was measured at a constant screw speed of 5 rpm over a period of 120 min. The die pressure fluctuated steadily between about 3 to 10 MPa over a timer period of several minutes. After 120 min. the screw speed was varied from 1 to 30 rpm. Large die pressure fluctuations continued and at 30 rpm caused automatic shutoff of the extruder which had a safety cutoff pressure set at 70 MPa. At 30 rpm flow rate was 19.8 g/min. Thus, the PET could not be extruded at screw speeds greater than 30 rpm or at a flow rate greater than 19.8 g/min. In addition, an accumulation of dark decomposed polymer was observed to build up at the exit of the capillary die at all extrusion speeds.

(B) Without changing conditions, the extruder feed was changed to a powder blend of the PET containing 0.05 wt. % of the fluoroelastomer described in Example 10. After several minutes at 5 rpm the large pressure fluctuations observed above abruptly ceased. After 120 minutes the screw speed was varied from 1 to 60 rpm, where the flow rate was 31.2 g/min. The pressure was steady at all speeds and there was no accumulation of decomposed polymer at the die exit. At 90 rpm the pressure exceeded the safety cutoff pressure.

Example 12

(A) In a procedure like that of Example 9, except that the extruder heating zones Nos. 1, 2, 3 and 4 were controlled at nominal temperature settings of 260°, 290°, 297° and 297° C., respectively, the performance of a commercially available extrusion grade copolymer of ethylene glycol and terephthalic acid containing 0.25 wt. % trimellitic anhydride, inherent viscosity (0.05 wt. % in a 3/1 mixture of methylene chloride and trifluoroacetone) 1.05, DSC melting point 254° C., was evaluated. Die pressure was measured at a constant screw speed of 5 rpm over a period of 120 min. The die pressure fluctuated steadily between about 3 to 10 MPa over a time period of several minutes. After 120 min. the screw speed was varied from 1 to 60 rpm. Large die pressure fluctuations contined at all speeds. Above 60 rpm pressure fluctuations caused automatic shutoff of the extruder (pressure reached 70 MPa). At 60 rmp the flow rate was 30.6 g/min. Thus, the PET could not be extruded at screw speeds greater than 60 rpm or at a flow rate greater than 30.6 g/min.

(B) Without changing conditions the extruder feed was changed to a powder blend of the same polyester containing 0.05 wt. % of the carboxyl-group-containing FEP copolymer described in Example 1. After several minutes at 5 rpm the large pressure fluctuations observed above abruptly ceased and the die pressure became steady. After 120 minutes the screw speed was varied from 1 to 90 rpm, where the flow rate was 40.8 g/min. and the pressure was steady at all speeds. At 120 rpm the pressure exceeded the safety cutoff pressure.

Comparative Example 6

The procedure of Example 12 was repeated except that in Part B a blend containing 0.05 wt. % of the FEP polymer described in Comparative Example 2 was evaluated. The large pressure fluctuations of Part A were not diminished in the procedure of Part B and continued for a period of greater than 120 minutes at 5 rpm. The screw speed was varied from 1 to 60 rpm, where die pressure fluctuations continued at all speeds. At 60 rpm the flow rate was 26.4 g/min. At 90 rpm the pressure exceeded the safety cutoff pressure of the extruder, 70 MPa.

Example 13

Figure 7:
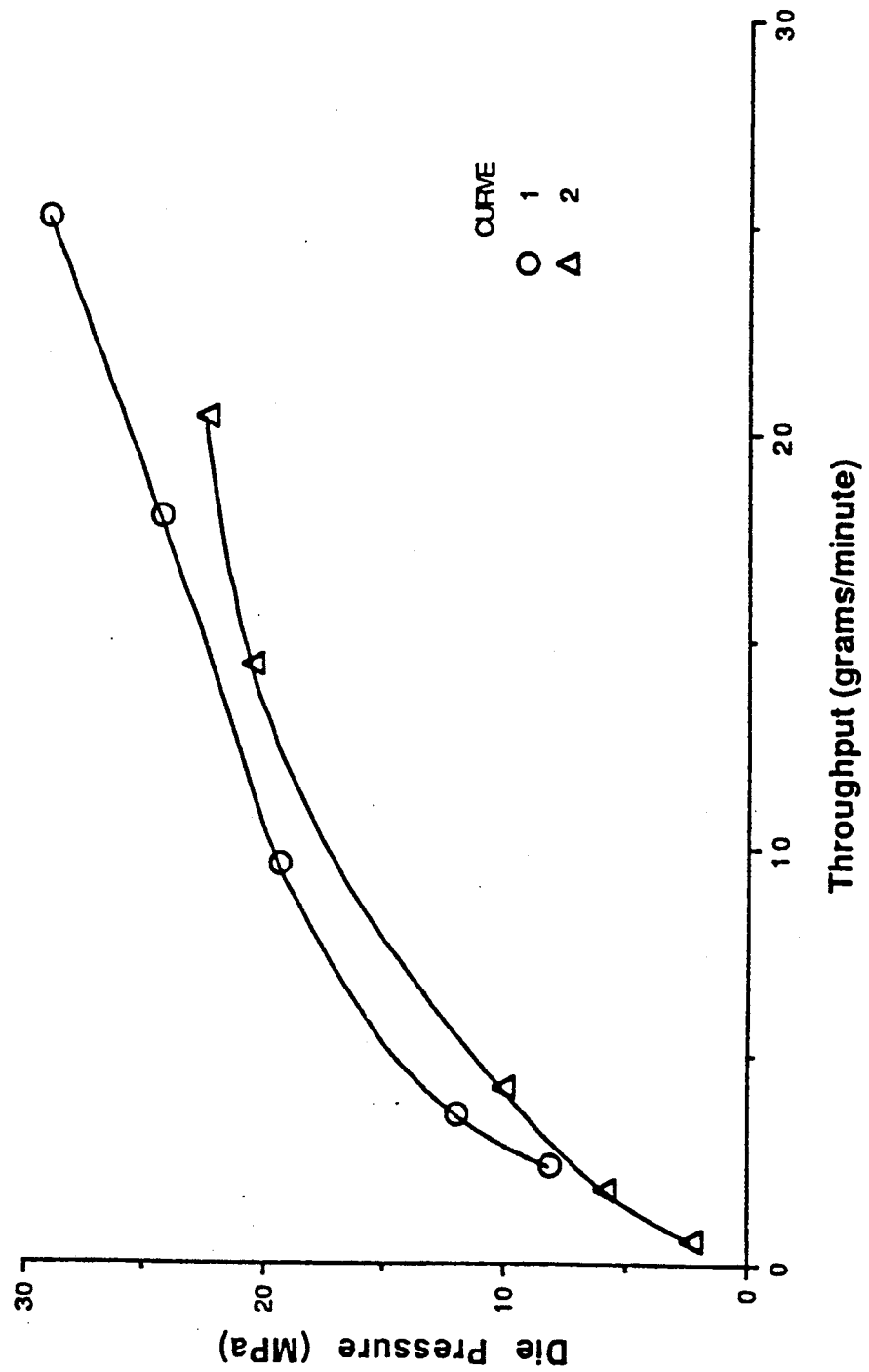

(A) In a procedure like that of Example 9 a commercially available fiber grade nylon 66 having a relative viscosity of 43, density 1.10 g/cc (T-972; Du Pont Co.) was fed into the extruder with the screw operating at 5 rpm and heating zones Nos. 1, 2, 3 and 4 controlled at nominal temperature settings of 260°, 270°, 270°, 270° C., respectively. After steady conditions were achieved, die pressure was measured at a constant screw speed of 5 rpm over a period of 120 minutes, during which time the die pressure fluctuated regularly between about 4.8 to 14 MPa with a time period of several minutes. The screw speed was then systematically varied from 1 rpm to 120 rpm. Large die pressure fluctuations were observed at all screw speeds up to 60 rpm (flow rate of 9.6 g/min.), diminishing to about ±0.7 MPa at 90 and 120 rpm. Representative extrusion data are shown in FIG. 7, Curve 1.

(B) Without changing conditions, the extruder feed was changed to a powder blend of the nylon containing 0.05 weight percent of the irradiated PTFE described in Example 2. After several minutes at 5 rpm the large fluctuations in die pressure observed in the procedure of Part A ceased and the die pressure became steady, with fluctuations of no more than ±0.15 MPa. Extrusion was continued without any further die pressure change. After 120 min., the screw speed was systematically varied from 1 rpm to 120 rpm. Die pressure was steady at all screw speeds with fluctuations of no more than ±0.15 MPa. Data are shown in FIG. 7, Curve 2.

Example 14

The evaluations reported below employed the apparatus described in Example 9, except for using a capillary die made from #416 nitrided stainless steel that had a diameter of 0.38 mm and a length of 0.76 mm. The die was heated in an electric furnace for 4 hours at 450° C. prior to use.

(A) A commerically available fiber grade nylon 66 having a relative viscosity of 43, density 0.10 g/cc (T-972; Du Pont Co.) was fed into the extruder with the screw operating at 5 rpm and heating zones Nos. 1, 2, 3 and 4 controlled at nominal temperature settings of 260°, 270°, 270° and 270° C., respectively, (No 4 is closest to the die). After equilibrium was achieved, screw speed was reduced to 3 rpm to achieve an extrusion rate of 2 g/min. Die pressure at this extrusion rate was 3.1 MPa. After a period of one hour no buildup of polymer was observed at the exit of the die. The temperatures of heating zones 3 and 4 were then both increased periodically in 5° C. increments, up to a temperature of 300° C. In each case the extrusion speed was adjusted to 2 g/min. by changing the rpm, and the extrusion was continued for one hour. Whenever a die deposit was observed to collect at the die exit, at any temperature, the die was cleaned by wiping shortly after increasing to the next higher temperature and adjusting the screw speed. Buildup of a ring of black decomposed polymer first appeared at the exit of the die, around the extruding nylon fiber, during the extrusion at 280° C. Similarly, a ring of demomposed polymer appeared at all temperatures tested between 280° and 300° C.

(B) Starting conditions were returned to a screw speed of 5 rpm and heating zones Nos. 1, 2, 3 and 4 where controlled at settings of 260°, 270°, 270° and 270° C., respectively. The extruder feed was changed to a powder blend of nylon containing 0.05 wt. % of the same irradiated PTFE as used in Example 2. After equilibrium was achieved, screw speed was increased to 10 rpm to achieve an extrusion rate of 2 g/min. Die pressure at this extrusion rate was 3.8 MPa. After a period of one hour, no buildup of polymer was observed at the exit of the die. The temperatures of heating zones 3 and 4 were then incrementally increased as described in Part A. Buildup of a globule of black decomposed polymer first appeared at the exit of the die, near the extruding nylon fiber, during the extrusion at 285° C. After wiping the die clean, a globule of decomposed polymer appeared at all temperatures tested between 285° C. and 300° C.

(C) The procedure of Part A was repeated except that the extruder feed was a powder blend of the nylon containing 0.05 wt. % of the same FEP as used in Example 1. After equilibrium was achieved at a melt temperature of 270° C. and a screw speed of 5 rpm, screw speed was held constant at 5 rpm to achieve an extrusion rate of 2 g/min. Die pressure at this extrusion rate was 4.7 MPa. After a period of one hour, no buildup of polymer was observed at the exit of the die. The temperatures of heating zones 3 and 4 were then both increased periodically in 5°. increments as described in Part A, and the extrusion speed was adjusted to 2 g/min. in each case. Buildup of a globule of black decomposed polymer first appeared at the exit of the die, near the extruding nylon fiber, during the extrusion at 280° C. and 300° C.

(D) The procedure of Part A was repeated except that the extruder feed was a powder blend of nylon containing 0.02 wt. % each of the fluorocarbon polymers described in Parts B and C. After equilibrium was achieved at a melt temperature of 270° C. and a screw speed of 5 rpm, screw speed was held constant at 5 rpm to achieve an extrusion rate of 2 g/min. Die pressure at this extrusion rate was 4.7 MPa. After a period of one hour, no buildup of polymer was observed at the exit of the die. The temperatures of heating zones 3 and 4 were then both increased periodically in 5 C increments to 300° C. as described in Part A. No buildup of either a ring or globule of decomposed polymer appeared at the exit of the die during extrusion at any temperature between 270° C. and 300° C., the highest temperature tested.

Example 15

In this example the extrusion of polymer alloy comprised of 50 wt. % Zytel® 101 Nylon 6/6 (Du Pont Co.), 16 parts of a copolymer of ethylene/n-butyl acrylate/glycidyl methacrylate (70.6/28/1.4 wt. ratio), 36 parts of an ethylene/n-butyl acrylate/methacrylic acid copolymer (65/25/10 wt. ratio) and containing 1 wt. % zinc stearate and 1.5 wt. % Irganox® 109B antioxidant was evaluated. The alloy was prepared by mixing in a twin-screw extruder at 285° C., 110 rpm, followed by pelletization and then drying to 0.15 wt. % or less of moisture. An extruder similar to that described in Example 9 with a single hole die set at a 45 degree exit angle was employed. With the system operating at 290° C. and polymer fed at 60 rpm, a dark ring of degraded polymer formed around the extrudate within a few minutes after extrusion began and slowly increased in size. Parts of the ring periodically broke away and formation of a new ring of degraded material formed again.

Without changing conditions a dry blend of the same alloy containing 0.05 wt. % of the FEP polymer described in Example 1 was fed to the extruder. The ring of degraded polymer gradually decreased in size until after 1.25 hrs. the die face was clean and a clean extrudate was observed The feed was then changed to a blend of the alloy containing 0.05 wt. % of the irradiated PTFE described in Example 2. There was an approximately 20% drop in die pressure and the extruder die remained free of degraded polymer deposits.

When the extruder feed was changed back to the polymer alloy not containing a fluoropolymer additive, the die pressure increased and a ring of degraded polymer soon formed at the die exit orifice.

Example 16

Using the polymer alloy described in Example 15 an injection blow molding trial was carried out with the parison die nozzle regulated at 280° C. In the absence of fluoropolymer additive there was a black die deposit buildup and deposition of the deposit onto the parison tube. There was no die deposit or contamination of the parison when a dry blend of the alloy containing 0.05 wt. % of the irradiated PTFE of Example 2 was used.

We claim:

1. Composition comprising a difficultly-melt-processible polymer and 0.002-0.5 wt. % of a fluoropolymer process aid that:
   (a) has a fluorine to carbon ratio of at least 1:1.5,
   (b) has polymer chain ends bearing a functional group, W, wherein W is selected from —COF, —SO$_2$F, SO$_3$M, —OSO$_3$M, —COOR and COOM, wherein R is C$_{1-3}$ alkyl group and M is hydrogen, a metal cation or a quaternary ammonium cation,
   (c) is selected from the group consisting of
      (i) an irradiated polytetrafluoroethylene,
      (ii) a partially crystalline copolymer of tetrafluoroethylene and a perfluoro(alkyl vinyl ether) or a perfluoroolefin containing 3–8 carbon atoms,
      (iii) an elastomeric copolymer of tetrafluoroethylene and a perfluoro(alkyl vinyl ether),
      (iv) a copolymer of tetrafluoroethylene and 0.5–40 mole % of a functional-group-containing monomer

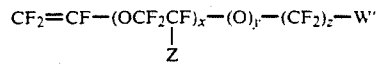

wherein Z is —F or —CF$_3$, x is 0 or an integer of 1–4, y is 0 or 1, z is an integer of 1–12, and W' is selected from —SO$_2$F, —SO$_2$Cl, —SO$_3$H, —COOR or —COOM, wherein R is C$_{1-3}$ alkyl and M is hydrogen, a metal cation, or a quaternary ammonium cation, and
   (d) contains at least 100 functional groups W per million carbon atoms.

2. Composition of claim 1 wherein, in W, the metal cation is an alkali metal or alkaline earth metal cation and, in W', the metal cation is an alkali metal cation.

3. Composition of claim 1 wherein the difficultly-melt-processible polymer is selected from mono-olefin polymers; vinyl aromatic polymers; copolymers of alpha-olefins and vinyl esters, (meth)acrylic esters, (meth)acrylic acids and their (ionomeric) metal salts or acrylonitrile; chlorinated polyethylene; polyvinyl chloride; polyamide; and polyester.

4. Composition of claim 3 wherein the difficultly-melt-processible polymer is a polyester.

5. Composition of claim 3 wherein the difficultly-melt-processible polymer is a polyamide.

6. Composition of claim 3 wherein the difficultly-melt-processible polymer is a copolymer of ethylene and vinyl acetate.

7. Composition of claim 3 wherein the difficultly-melt-processible polymer is a polystyrene.

8. Composition of claim 3 wherein the difficultly-melt-processible polymer is a hydrocarbon mono-olefin polymer.

9. The composition of claim 8 wherein the hydrocarbon polymer is a homopolymer or copolymer of one or more monoolefins of the formula RCH=CH$_2$ wherein R is H or alkyl.

10. The composition of claim 9 wherein alkyl is C$_{1-8}$ alkyl.

11. The composition of claim 8 wherein the hydrocarbon polymer is low density polyethylene.

12. The composition of claim 8 wherein the hydrocarbon polymer is linear low density polyethylene.

13. The composition of claim 8 wherein the hydrocarbon polymer is high density polyethylene.

14. The composition of claim 8 wherein the hydrocarbon polymer is a copolymer of ethylene, propylene and a non-conjugated diene.

15. The composition of claim 1 wherein W is —SO$_3$H.

16. The composition of claim 1 wherein W is —COF.

17. The composition of claim 1 wherein W is —COOH.

18. The composition of claim 1 wherein the fluoropolymer is a partially crystalline copolymer of tetrafluoroethylene and a perfluoro(alkyl vinyl ether).

19. The composition of claim 18 wherein the alkyl group is propyl.

20. The composition of claim 1 wherein the fluoropolymer is (c)(iii).

21. The composition of claim 20 wherein the alkyl group is methyl.

22. The composition of claim 1 wherein the fluoropolymer is a partially crystalline copolymer of tetrafluoroethylene and a perfluoroolefin containing 3–8 carbon atoms.

23. The composition of claim 22 wherein the perfluoroolefin is hexafluoropropylene.

24. The composition of claim 1 wherein the fluoropolymer is polytetrafluoroethylene that has been treated with 15-80 megarads of ionizing radiation and W is —COF.

25. The composition of claim 1 wherein the fluoropolymer is polytetrafluoroethylene that has been treated with 15-80 megarads of ionizing radiation and W is —COOH.

26. The composition of claim 1 wherein the fluoropolymer is (c) (IV).

27. The composition of claim 26 wherein the fluoropolymer is a copolymer of tetrafluoroethylene and perfluoro-3,6-dioxa-4-methyl-7-octene sulfonic acid.

28. The composition of claim 26 wherein the fluoropolymer is a copolymer of tetrafluoroethylene and methyl perfluoro(4,7-dioxa-5-methyl-8-noneneoate).

29. The composition of claim 26 wherein the fluoropolymer is a copolymer of tetrafluoroethylene and perfluoro-3,6-dioxa-4-methyl-7-octene sulfonyl fluoride.

30. The composition of claim 26 wherein the fluoropolymer is a copolymer of tetrafluoroethylene and perfluoro-4,7-dioxa-5-methyl-8-nonenoic acid.

31. The composition of claim 1 comprising a blend of difficultly-melt-processible polymers.

32. The composition of claim 1 wherein the difficultly-melt-processible polymer is a polymeric alloy.

33. The composition of claim 32, wherein the alloy is comprised of a polyamide 6/6, an ethylene/n-butyl acrylate/methacrylic acid copolymer and an ethylene/n-butyl acrylate/glycidyl methacrylate copolymer.

34. Composition comprised of linear low density polyethylene and 0.002-0.5 wt. % of a partially crystalline copolymer of tetrafluoroethylene and hexafluoropropylene having at least 200 —COF and —COOH groups per million carbon atoms.

35. Composition comprising linear low density polyethylene and 0.002-0.5 wt. % of polytetrafluoroethylene that has been treated with ionizing radiation sufficient to provide at least 200 —COF and —COOH groups per million carbon atoms.

36. Process comprising melt extruding a difficultly-melt-processible polymer having incorporated therein an effective amount, to improve processibility, of a fluoropolymer process aid that:
(a) has a fluorine to carbon ratio of at least 1:1.5,
(b) has polymer chain ends bearing a functional group, W, wherein W is selected from —COF, —SO$_2$F, SO$_3$M, —OSO$_3$M, —COOR and COOM, wherein R is a C$_{1-3}$ alkyl group and M is hydrogen, a metal cation or a quaternary ammonium cation,
(c) is selected from the group consisting of
  (i) an irradiated polytetrafluoroethylene,
  (ii) a partially crystalline copolymer of tetrafluoroethylene and a perfluoro(alkyl vinyl ether) or a perfluoroolefin containing 3-8 carbon atoms,
  (iii) an elastomeric copolymer of tetrafluoroethylene and a perfluoro(alkyl vinyl ether),
  (iv) a copolymer of tetrafluoroethylene and 0.5-40 mole % of a functional-group-containing monomer

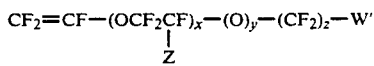

wherein Z is —F or —CF$_3$, x is 0 or an integer of 1-4, y is 0 or 1, z is an integer of 1-12, and W, is selected from —SO$_2$F, —SO$_2$Cl, —SO$_3$H, —COOR or —COOM, wherein R is C$_{1-3}$ alkyl and M is hydrogen, a metal cation, or a quaternary ammonium cation, and
(d) contains at least 100 functional groups W per million carbon atoms.

37. Process of claim 36 wherein the concentration of fluoropolymer is 0.002-0.5 wt. %, based on the difficultly-melt-processible polymer.

38. Process of claim 36 wherein the difficultly-melt-processible polymer is a polyester.

39. Process of claim 36 wherein the difficultly-melt-processible polymer is a polyamide.

40. Process of claim 36 wherein the difficultly-melt-processible polymer is a copolymer of ethylene and vinyl acetate.

41. Process of claim 36 wherein the difficultly-melt-processible polymer is a polystyrene.

42. Process of claim 36 wherein the difficultly-melt-processible polymer is a hydrocarbon mono-olefin polymer.

43. The process of claim 42 wherein the hydrocarbon polymer is linear low density polyethylene and the fluoropolymer is a partially crystalline copolymer of tetrafluoroethylene and hexafluoropropylene, has at least 200 —COF and —COOH groups per million carbon atoms and is present in an amount of 0.005-0.5 wt. %, based on the hydrocarbon polymer.

44. The process of claim 42 wherein the hydrocarbon polymer is linear low density polyethylene and the fluoropolymer is a polytetrafluoroethylene that has been treated with ionizing radiation sufficient to provide at least 200 —COF and —COOH groups per million carbon atoms and is present in an amount of 0.005-0.5 wt. %, based on the hydrocarbon polymer.

45. Process of claim 36 wherein W is —SO$_3$H.

46. Process of claim 36 wherein W is —COF.

47. Process of claim 36 wherein W is —COOH.

48. Process of claim 36 wherein the fluoropolymer is a partially crystalline copolymer of tetrafluoroethylene and a perfluoro(alkyl vinyl ether).

49. Process of claim 48 wherein the alkyl group is propyl.

50. Process of claim 36 wherein the fluoropolymer is (c)(iii).

51. Process of claim 50 wherein the alkyl group is methyl.

52. Process of claim 36 wherein the fluoropolymer is a partially crystalline copolymer of tetrafluoroethylene and a perfluoroolefin containing 3-8 carbon atoms.

53. Process of claim 52 wherein the perfluoroolefin is hexafluoropropylene.

54. Process of claim 36 wherein the fluoropolymer is polytetrafluoroethylene that has been treated with 15-80 megarads of ionizing radiation and W is —COF.

55. Process of claim 36 wherein the fluoropolymer is polytetrafluoroethylene that has been treated with 15-80 megarads of ionizing radiation and W is —COOH.

56. Process of claim 36 wherein the fluoropolymer is (c) (iv).

57. Process of claim 56 wherein the fluoropolymer is a copolymer of tetrafluoroethylene and perfluoro-3,6-dioxa-4-methyl-7-octene sulfonic acid.

58. Process of claim 56 wherein the fluoropolymer is a copolymer of tetrafluoroethylene and methyl perfluoro(4,7-dioxa-5-methyl-8-noneneoate).

59. Process of claim 56 wherein the fluoropolymer is a copolymer of tetrafluoroethylene and perfluoro-3,6-dioxa-4-methyl-7-octene sulfonyl fluoride.

60. Process of claim 56 wherein the fluoropolymer is a copolymer of tetrafluoroethylene and perfluoro-4,7-dioxa-5-methyl-8-nonenoic acid.

61. Process of claim 36 wherein the difficultly-melt-processible polymer has incorporated therein a mixture of process aids.

62. Process of claim 36 wherein the difficultly-melt-processible polymer is comprised of a mixture of such polymers.

63. Process of claim 36 wherein the difficultly-melt-processible polymer is a polymeric alloy.

64. Process of claim 63 wherein the alloy is comprised of a polyamide 6/6, an ethylene/n-butyl acrylate/methacrylic acid copolymer and an ethylene/n-butyl acrylate/glycidyl methacrylate copolymer.

65. Composition of claim 1 wherein the concentration of fluoropolymer process aid is 0.01-0.2 wt. %, based on the difficultly-melt-processible polymer.

66. Composition of claim 34 wherein the concentration of the partially crystalline copolymer is 0.01-0.2 wt. %, based on the polyethylene.

67. Composition of claim 35 wherein the concentration of the treated polytetrafluoroethylene is 0.01-0.2 wt. %, based on the polyethylene.

68. Process of claim 36 wherein the concentration of fluoropolymer is 0.01-0.2 wt. %, based on the difficultly-melt-processible polymer.

69. The composition of claim 1 comprising a mixture of fluoropolymer process aids.

70. The process of claim 36 wherein a mixture of fluoropolymer process aids is incorporated into the difficultly-melt-processible polymer.

* * * * *

UNITED STATES PATENT AND TRADEMARK OFFICE
CERTIFICATE OF CORRECTION

PATENT NO. : 5,132,368

DATED : July 21, 1992

INVENTOR(S) : Chapman, Jr. et al.

It is certified that error appears in the above-identified patent and that said Letters Patent is hereby corrected as shown below:

Column 22, line 2, replace "W," with --W'--

Signed and Sealed this

Thirty-first Day of August, 1993

Attest:

BRUCE LEHMAN

Attesting Officer

Commissioner of Patents and Trademarks